US012732935B2

(12) United States Patent
Hu et al.

(10) Patent No.: US 12,732,935 B2
(45) Date of Patent: Sep. 8, 2026

(54) METHOD AND APPARATUS FOR BROADCASTING PUBLIC INFORMATION, AND DEVICE AND MEDIUM

(71) Applicant: GUANGDONG OPPO MOBILE TELECOMMUNICATIONS CORP., LTD., Dongguan (CN)

(72) Inventors: Yi Hu, Dongguan (CN); Haitao Li, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 322 days.

(21) Appl. No.: 18/215,706

(22) Filed: Jun. 28, 2023

(65) Prior Publication Data

US 2023/0345399 A1 Oct. 26, 2023

Related U.S. Application Data

(63) Continuation of application No. PCT/CN2020/142190, filed on Dec. 31, 2020.

(51) Int. Cl.

| | |
|---|---|
| ***H04W 74/0833*** | (2024.01) |
| ***H04L 1/1812*** | (2023.01) |
| ***H04W 56/00*** | (2009.01) |
| *H04W 74/0836* | (2024.01) |
| *H04W 84/06* | (2009.01) |

(52) U.S. Cl.

CPC ....... *H04W 56/0045* (2013.01); *H04L 1/1812* (2013.01); *H04W 74/0833* (2013.01); *H04W 74/0836* (2024.01); *H04W 84/06* (2013.01)

(58) Field of Classification Search

CPC .............. H04B 7/1855; H04B 7/18513; H04B 7/18543; H04B 7/18547; H04L 1/1812; H04W 56/0045; H04W 74/0833

USPC ....................... 370/316, 329, 350; 455/456.1

See application file for complete search history.

(56) References Cited

U.S. PATENT DOCUMENTS

| | | | | |
|---|---|---|---|---|
| 2022/0263570 | A1* | 8/2022 | Wang | H04B 7/18513 |
| 2023/0189200 | A1* | 6/2023 | Luo | H04B 7/1855 455/456.1 |
| 2023/0388007 | A1* | 11/2023 | Löhr | H04B 7/18543 |

FOREIGN PATENT DOCUMENTS

| | | | |
|---|---|---|---|
| CN | 111565472 | A | 8/2020 |
| WO | 2020204421 | A1 | 10/2020 |

OTHER PUBLICATIONS

Extended European Search Report issued in corresponding European application No. 20967753.3, mailed Jan. 2, 2024.

Source: Asia Pacific Telecom; Title: Discussion on reference timing delivery for NTN 3GPP TSG RAN WG1#102-e R1-2006643 e-Meeting, Aug. 17-28, 2020.

(Continued)

*Primary Examiner* — Harun Chowdhury

(74) *Attorney, Agent, or Firm* — BAYES PLLC

(57) ABSTRACT

The present application relates to the field of mobile communications. Disclosed are a method and apparatus for broadcasting public information, and a device and a medium. The method comprises: a terminal receiving first public information for an NTN that is broadcast by a network device. The updating of the first public information does not cause a change in a system information update indication, and/or the updating of the first public information does not cause a change in a value tag in an SIB1.

12 Claims, 6 Drawing Sheets

(56) References Cited

OTHER PUBLICATIONS

Source: OPPO; Title: Consideration on MAC enhancement for NTN 3GPP TSG-RAN WG2 Meeting #111 electronic R2-2006781 Online, Aug. 17-28, 2020.

Source: InterDigital (email discussion Rapporteur); Title: Summary of [AT111][107][NTN] Pre-compensation and other MAC issues; 3GPP RAN WG2 Meeting #111e R2-2008188 Aug. 17-28, 2020.

OPPO, "Discussion on enhancement of UL time and frequency synchronization", R1-2006030, 3GPP TSG RAN WG1 #102 e-Meeting, Aug. 17-28, 2020.

Ericsson, "Aspects for Earth fixed and Earth moving beams for NTN", R2-2009823, 3GPP TSG-RAN WG2 Meeting #112 electronic Online, Nov. 2-13, 2020.

International Search Report issued in international application No. PCT/CN2020/142190, mailed Jun. 15, 2021.

Written Opinion of the International Searching Authority issued in international application No. PCT/CN2020/142190, mailed Jun. 15, 2021.

3GPP TR 38.821 V1.0.0 (Dec. 2019); Technical Specification Group Radio Access Network; Solutions for NR to support non-terrestrial networks (NTN) (Release 16).

* cited by examiner

METHOD AND APPARATUS FOR BROADCASTING PUBLIC INFORMATION, AND DEVICE AND MEDIUM

CROSS-REFERENCE TO RELATED APPLICATION

This application is a continuation of International Application No. PCT/CN2020/142190 filed on Dec. 31, 2020, which is hereby incorporated by reference in its entirety.

TECHNICAL FIELD

The present disclosure relates to the field of mobile communication, and more particularly, to a method and apparatus for broadcasting common information, and a device and a medium.

BACKGROUND

An important feature of an uplink transmission is that different User Equipment (UEs) perform time-frequency orthogonal multiple access. That is, uplink transmissions from different UEs in the same cell do not interfere with each other.

In order to ensure the orthogonality of uplink transmissions and avoid intra-cell interferences, the base station requires that times when signals from different UEs at the same time but with different frequency domain resources arrive at the base station are substantially aligned. In order to ensure the time synchronization at the base station side, a New Radio (NR) system supports an uplink Timing Advance (TA) mechanism.

The base station will send a TA command to the UE, so that the UE can update its own TA. However, in some cases, the base station needs to update the common TA frequently, and in these cases, how to broadcast the common TA becomes an urgent problem to be solved.

SUMMARY

Embodiments of the present disclosure provide a method and apparatus for broadcasting common information, and a device and a medium, which can also support frequent broadcasting of a common TA in a case where a system information update period is relatively large.

According to an aspect of the present disclosure, there is provided a method for broadcasting common information. The method includes: receiving, by a terminal, first common information for a Non-Terrestrial Network (NTN) broadcast by a network device.

An update of the first common information does not result in a change of a system information update indication, and/or the update of the first common information does not result in a change of valueTag in a SIB1.

According to an aspect of the present disclosure, there is provided a method for broadcasting common information. The method includes: broadcasting, by a network device, first common information for a NTN to a terminal.

An update of the first common information does not result in a change of a system information update indication, and/or the update of the first common information does not result in a change of valueTag in a SIB1.

According to an aspect of the present disclosure, there is provided an apparatus for broadcasting common information. The apparatus includes: a receiving module, configured to receive first common information for a Non-Terrestrial Network (NTN) broadcast by a network device.

An update of the first common information does not result in a change of a system information update indication, and/or the update of the first common information does not result in a change of valueTag in a SIB1.

According to an aspect of the present disclosure, there is provided an apparatus for broadcasting common information. The apparatus includes: a sending module, configured to broadcast first common information for a NTN to a terminal.

An update of the first common information does not result in a change of a system information update indication, and/or the update of the first common information does not result in a change of valueTag in a SIB1.

According to an aspect of the present disclosure, there is provided a terminal, including a processor, a transceiver connected to the processor, and a memory configured to store executable instructions for the processor. The processor is configured to load and execute the executable instructions to perform the method for broadcasting common information as described in the above aspect.

According to an aspect of the present disclosure, there is provided a network device, including a processor, a transceiver connected to the processor, and a memory configured to store executable instructions for the processor. The processor is configured to load and execute the executable instructions to perform the method for broadcasting common information as described in the above aspect.

According to an aspect of the present disclosure, there is provided a computer-readable storage medium having executable instructions stored thereon. The executable instructions are loaded and executed by a processor to perform the method for broadcasting common information as described in the above aspect.

According to an aspect of the present disclosure, there is provided a computer program product or a computer program, including computer instructions stored on a computer-readable storage medium and read by a processor of a computer device from the computer-readable storage medium. The processor is configured to execute the computer instructions to cause the computer device to perform the method for broadcasting common information as described in the above aspect.

According to an aspect of the present disclosure, there is provided a chip, including a programmable logic circuit or a program. The chip is configured to implement the method for broadcasting common information as described in the above aspect.

The technical solutions provided by embodiments of the present disclosure at least include the following beneficial effects.

The first common information for the NTN is broadcast to the terminal by the network device, but the update of the first common information does not result in the change of the system information update indication, and/or does not result in the change of the valueTag in SIB1. Thus, the same or different first common information is broadcast multiple times in the same system information update period. Regardless of the magnitude of the system information update period, it is supported that the network device frequently updates the first common information for the terminal. That is, the network device can update the first common information in real time. The network device does not need to set the system information update period to be very small for the purpose of supporting the frequent update of the first common information.

In addition, since the update of the first common information does not result in the change of the system information update indication, for a terminal that does not need the first common information, it is not necessary for the terminal to read the system broadcast once every time the first common information is updated. This helps to avoid an invalid receiving process and reduce the power consumption of the terminal. The terminal can also obtain the first common information in real time according to its own needs, so as to ensure the timeliness in update of the first common information without affecting the update of other information, especially in a scenario of non-geosynchronous orbit.

BRIEF DESCRIPTION OF THE DRAWINGS

In order to explain technical solutions in embodiments of the present disclosure more clearly, drawings needed in the description of these embodiments will be briefly introduced below. Obviously, the drawings in the following description are only some embodiments of the present disclosure. For those of ordinary skill in the art, other drawings may be obtained from these drawings without creative efforts.

DETAILED DESCRIPTION

Figure 1:
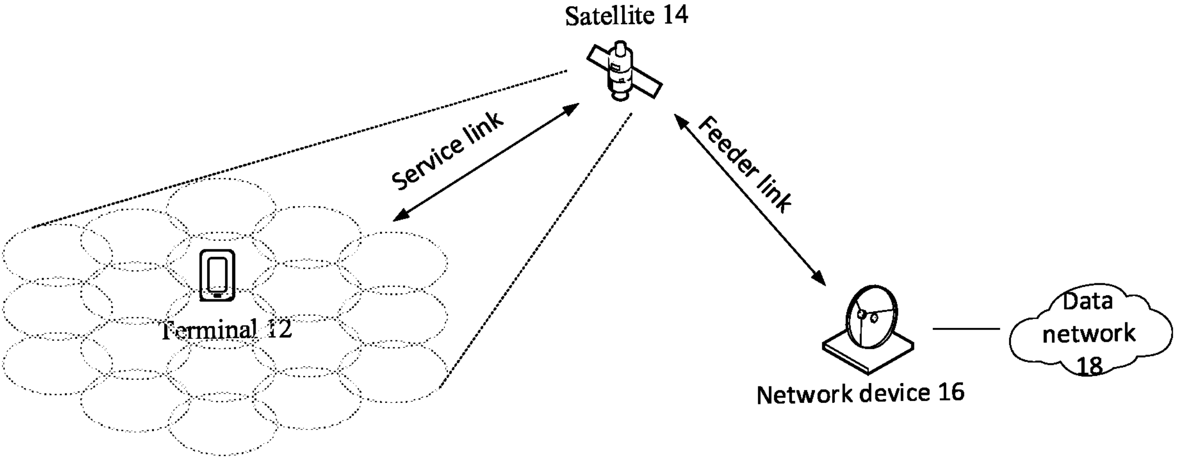
FIG. 1 is a schematic diagram of a NTN scenario based on a transparently transmitted payload according to an exemplary embodiment of the present disclosure.

In order to make objectives, technical solutions, and advantages of the present disclosure clearer, implementations of the present disclosure will be further described in detail below with reference to the drawings.

Before introducing a method provided by embodiments of the present disclosure in detail, a brief introduction is made to the relevant terms and implementation environments involved in embodiments of the present disclosure.

Firstly, a brief introduction to the relevant terms involved in the present disclosure is given.

1. NTN

At present, Third Generation Partnership Project (3GPP) is studying NTN technologies, which generally use satellite communications to provide communication services for terrestrial users. Compared with terrestrial cellular networks, the satellite communications have many unique advantages. First of all, the satellite communications are not restricted by user geographical positions. For example, the typical terrestrial communications cannot cover areas where communication devices cannot be set up such as oceans, mountains, and deserts, or areas that are not covered with the communications due to sparse population. However, for the satellite communications, since one satellite can cover a large terrestrial area and the satellite can orbit round the earth, every corner on the earth can be covered by the satellite communications from a theoretical perspective. Secondly, the satellite communications have greater social value. Remote mountainous areas, poor and backward countries or regions can be covered by the satellite communications at a lower cost, so that people in these areas can enjoy advanced voice communications and mobile Internet technologies. This facilitates to narrow the digital divide between these areas and developed areas, and promotes the development of these areas. Thirdly, the satellite communications have a long communication distance, and the communication cost does not increase significantly as the communication distance increases. Finally, the satellite communications have a high stability, and are not affected by natural disasters.

Depending on orbital altitudes of communication satellites, the communication satellites may be classified into: Low-Earth Orbit (LEO) satellites, Medium-Earth Orbit (MEO) satellites, Geostationary Earth Orbit (GEO) satellites, and High Elliptical Orbit (HEO) satellites, etc. At present, 3GPP mainly studies the LEO satellites and the GEO satellites.

(1) LEO

An altitude range of the low-orbit satellite is 500 km to 1500 km, and the corresponding orbital period is about 1.5 hours to 2 hours. A signal propagation latency of single-hop communication between users is generally less than 20 ms, and the maximum satellite visible time is 20 minutes. The signal propagation distance is short, link loss is low, and requirements for transmission power of the user terminal is low.

(2) GEO

The geostationary earth orbit satellite has an orbital altitude of 35786 km and a rotation period around the earth of 24 hours. The signal propagation latency of single-hop communication between users is generally 250 ms.

In order to ensure the coverage area of the satellite and increase a system capacity of the entire satellite communication system, the satellite uses multiple beams to cover the ground. One satellite may form dozens or even hundreds of beams to cover the ground. One satellite beam may cover a ground area with a diameter of tens to hundreds of kilometers.

Figure 2:
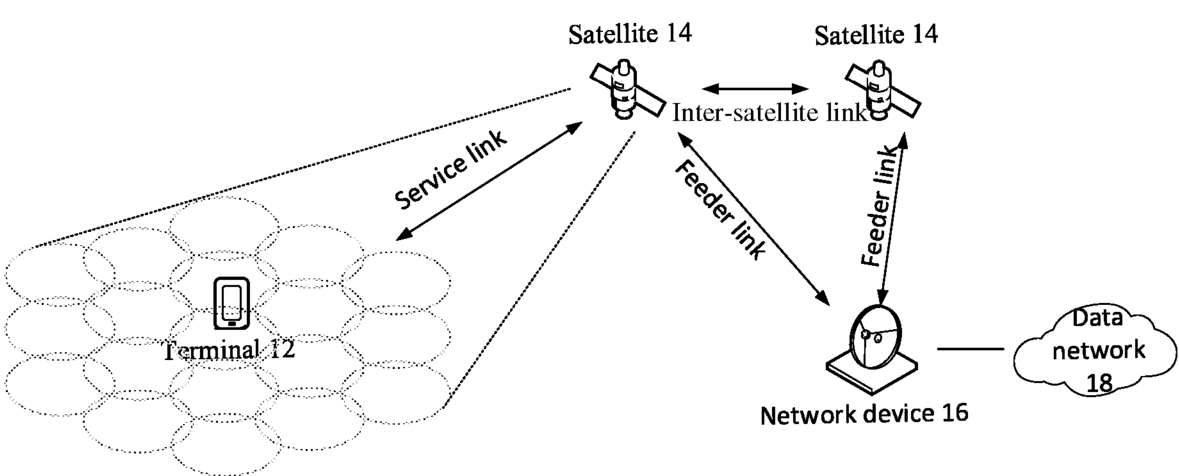
FIG. 2 is a schematic diagram of a NTN scenario based on a regenerative payload according to an exemplary embodiment of the present disclosure.

At present, there are at least two NTN scenarios: a NTN scenario based on a transparently transmitted payload and a NTN scenario based on a regenerative payload. FIG. 1 shows a schematic diagram of a NTN scenario based on a transparently transmitted payload, and FIG. 2 shows a schematic diagram of a NTN scenario based on a regenerative payload.

A NTN network consists of the following network elements:

- one or more network devices 16, for connecting a satellite 14 and a data network 18 on the ground.
- a feeder link: a link for communication between the network device 16 and the satellite 14;
- a service link: a link for communication between a terminal 12 and the satellite 14;
- the satellite 14: in terms of functions the satellite 14 provides, it may be divided into two types: the transparently transmitted payload and the regenerative payload.
- transparently transmitted payload: only functions of radio frequency filtering, frequency conversion, and amplification are provided, and only transparent forwarding of a signal is provided, without changing a waveform signal it forwards.
- regenerative payload: in addition to provision of the functions of radio frequency filtering, frequency conversion, and amplification, functions of demodulation/decoding, routing/conversion, encoding/modulation may also be provided. It has part or all of the functions of a base station.
- an Inter-Satellite Link (ISL): existing in the NTN scenario of the regenerative payload.

2. Uplink Timing Advance

An important feature of an uplink transmission is that different terminals perform time-frequency orthogonal multiple access. That is, uplink transmissions from different terminals in the same cell do not interfere with each other.

In order to ensure the orthogonality of uplink transmissions and avoid interferences between the uplink transmissions from different terminals in the same cell, a network device (e.g., a base station) requires that times when uplink transmissions of the terminal from the same slot but different frequency domain resources arrive at the network device are substantively aligned. Since the network device can correctly decode an uplink transmission sent by the terminal as long as it receives the uplink transmission sent by the terminal within a range of Cyclic Prefix (CP), the network device requires that the times when uplink transmissions of the terminal from the same slot but different frequency domain resources arrive at the network device all fall within the CP.

In order to ensure time synchronization of network devices, NR supports an uplink timing advance mechanism. For the terminal, TA is essentially a slot offset value between receipt of a downlink transmission and sending of an uplink transmission. By appropriately controlling a TA slot offset value of each terminal, the network device can control the times when uplink transmissions from different terminals arrive at the network device. For a terminal that is farther away from the network device, due to a larger round-trip time in signal propagation, it needs to send the uplink transmission earlier than a terminal that is closer to the network device.

Figure 3:
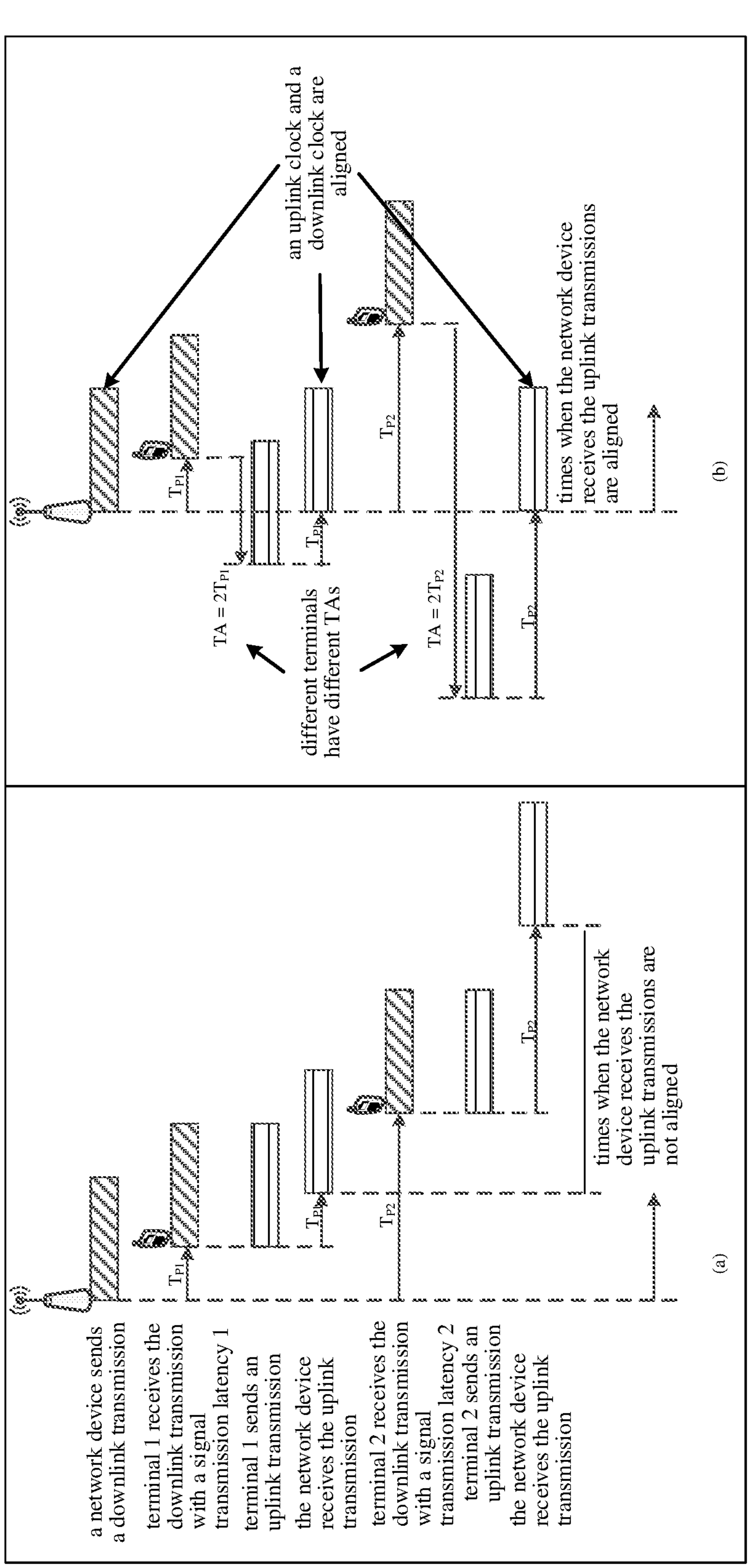
FIG. 3 is a schematic diagram of timing advance according to an exemplary embodiment of the present disclosure.

FIG. 3 shows a schematic diagram of timing advance. As shown in (a) of FIG. 3, when the terminal does not perform the uplink timing advance, the times when uplink transmissions of the terminal from the same slot but different frequency domain resources arrive at the network device have relatively larger differences. As shown in (b) of FIG. 3, when the terminal performs the uplink timing advance, the times when uplink transmissions of the terminal from the same slot but different frequency domain resources arrive at the network device are substantially aligned.

It should be noted that from (b) of FIG. 3, it can be seen that an uplink clock and a downlink clock of the network device are aligned, but there is an offset between an uplink clock and a downlink clock of the terminal, and timing advances for different terminals may be different.

Exemplarily, the network device may determine a TA value of the terminal by measuring the uplink transmission of the terminal, and the network device in turn sends a TA command to the terminal in the following two modes.

First mode: acquisition of an initial TA;

In a random access procedure, the network device may determine the TA value of the terminal by measuring the received preamble, and send it to the terminal through a Timing Advance Command (TAC) field in a Random Access Response (RAR).

Second mode: adjustment of the TA in a RRC-connected state;

Although the terminal and the network device have achieved uplink synchronization in the random access procedure, the time when the uplink transmission arrives at the network device may change. Exemplarily, for a terminal moving at a high speed, a round-trip time in signal propagation between the terminal and the network device will constantly change. Therefore, the terminal needs to constantly update its TA value, so as to maintain the uplink synchronization with the network device.

As an example, the network device may use a closed-loop mechanism to adjust the TA value. That is, the network device may determine the TA value of the terminal by measuring the uplink transmission of the terminal. Therefore, as long as the terminal has the uplink transmission, the network device may use it for estimating the TA value. In theory, any signal sent by the terminal may be used by the network device to measure the TA value. For example, a Sounding Reference Signal (SRS), a Demodulation Reference Signal (DMRS), a Channel Quality Indication (CQI), an Acknowledgment (ACK) or a Negative-Acknowledgment (NACK), a Physical Uplink Shared Channel (PUSCH), or the like, may be used by the network device for measuring the TA value.

If a TA value of a certain terminal needs to be corrected, the network device may send a TAC to the terminal for requiring the terminal to adjust the TA value. The TAC may be sent to the terminal through a Media Access Control (MAC) Control Element (CE).

3. Random Access Procedure

Figure 4:
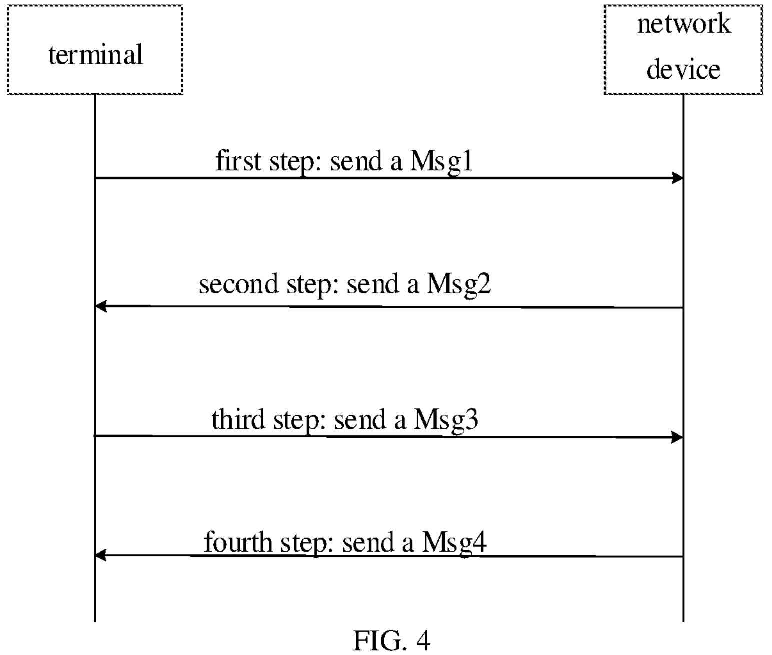
FIG. 4 is a flowchart of a random access procedure according to an exemplary embodiment of the present disclosure.

With reference to FIG. 4, the random access procedure generally includes four steps as follows.

In a first step, the terminal sends Msg1 to the network device, where the Msg1 is a random access preamble (i.e., a preamble).

The terminal sends Msg1 to the network device, so as to notify the network device of a random access request, and further to enable the network device to estimate a transmission latency between the network device and the terminal, thereby calibrating an uplink time based thereon.

As an example, information about a resource for sending Msg1 may be acquired through a resource configuration of a Random Access Channel (RACH). In the Rel-15 NR technologies, RACH resource configuration information configured for the terminal access is defined, including 256 types, and a cell may indicate the RACH resource configuration information used by itself to the terminal in system information. Each type of RACH resource configuration information includes a preamble format, a period, a radio frame offset, a subframe number in a radio frame, a starting symbol in a subframe, the number of PRACH slots in a subframe, the number of PRACH occasions in a PRACH slot, and a duration of a PRACH occasion. Through these information, time domain information, frequency domain information, and code domain information of a PRACH resource may be determined. In this way, the terminal may send Msg1 on the respective PRACH resource according to the RACH resource configuration information indicated by the network device.

In a second step, after detecting the Msg1 sent by the terminal, the network device sends a RAR (Msg2) to the terminal, so as to inform the terminal of uplink resource information that may be used when the terminal sends the next message (Msg3).

One RAR may include response messages to a plurality of terminals sending the preambles, and the response message to each terminal includes a Random Access Preamble Identity (RAP ID) field used by each terminal, resource allocation information of Msg3, TA information, etc.

It should be noted that, in addition to above, the network device may further perform other operations, such as allocating a temporary Radio Network Temporary Identity (RNTI) to the terminal, etc., which will not be introduced in detail here.

In a third step, the terminal receives RAR, and sends Msg3 to the network device on an uplink resource indicated by RAR.

In some embodiments, the terminal may monitor a Physical Downlink Control Channel (PDCCH) in a search space within a RAR time window corresponding to RAR, so as to receive RAR. The RAR time window may be configured through a higher layer parameter, and configuration information of the search space of PDCCH may be indicated through the system information.

If the terminal does not receive the RAR sent by the network device within the RAR time window, it is considered that this random access procedure has failed. If the terminal receives one RAR, and a preamble index in the RAR is the same as a preamble index sent by the terminal, it is considered that the RAR has been successfully received. In this case, the terminal may stop monitoring the RAR, and the terminal sends Msg3 to the network device.

As an example, the Msg3 may carry terminal-specific temporary identity information or a terminal identifier from a core network. For example, the terminal identifier may be a Serving-Temporary Mobile Subscriber Identity (S-TMSI) or a random number.

In a fourth step, after receiving the Msg3, the network device sends Msg4 to the terminal.

As an example, Msg4 includes a contention resolution message, and also includes information about the uplink transmission resource allocated to the terminal. Exemplarily, in a conflict resolution mechanism, the network device may carry a unique identifier in Msg4 to indicate a terminal that wins the contention. When the terminal receives the Msg4 sent by the base station, it will monitor whether the temporary identity information sent by the terminal in Msg3 is included in the contention resolution message sent by the network device. If so, it indicates that the random access procedure of the terminal is successful. Otherwise, the terminal needs to initiate the random access procedure again from the first step.

System Information Update Period

Figure 5:
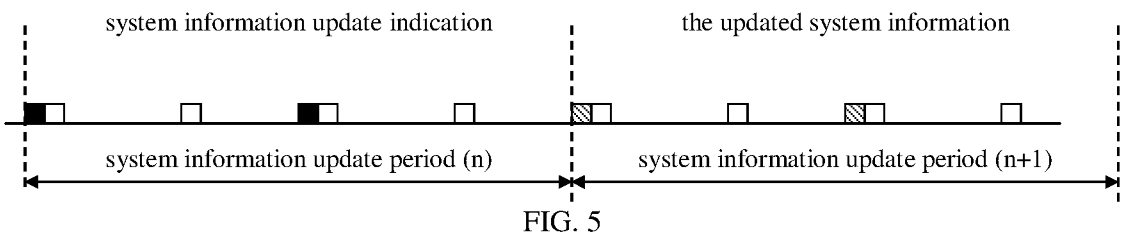
FIG. 5 is a schematic diagram of a system information update period according to an exemplary embodiment of the present disclosure.

In a Long-Term Evolution (LTE) system and a NR system, the concept of system information update period is used. As shown in FIG. 5, when the network device intends to update the system information, the network device first repeatedly sends a system information update indication in the n-th system information update period, and then repeatedly sends the changed system information in the (n+1)-th system information update period. The boundary of the system information update period is defined as a System Frame Number (SFN) that satisfies SFN mod m=0, where m is the number of SFNs included in one system information update period. m=modificationPeriodCoeff*defaultPagingCycle, where modificationPeriodCoeff and defaultPagingCycle are a system information update period coefficient and a default paging cycle, respectively, and these two parameters are both determined based on broadcast from the network device.

In the NR system, the common TA is sent to the terminal in the form of broadcast. If the common TA needs to be updated frequently, the above-mentioned system information update period needs to be set to a relatively small value. This may cause more broadcast resources to be used, and every time a value of the system information update indication changes, the terminal needs to receive the system information again, even if it does not need common TA information, thereby wasting more power.

In the NR system, the system information update period is applicable to the update of system information except for SIB6, SIB7, SIB8, and positioning assistance data. In NR, the following applies:

- if a value of the system information update indication (systemInfoModification) in a short message is 1, it means that other system information needs to be updated except for SIB6/SIB7/SIB8, and the UE will acquire the updated system information in the next system information update period.
- if a value of etwsAndCmasIndication in the short message is 1, it means that the network will send an Earthquake and Tsunami Warning System (ETWS) notification and/or a Commercial Mobile Alert System (CMAS) notification, and the UE will immediately re-read SIB1 and SIB6/SIB7/SIB8 after receiving the short message.

In an implementation scenario, all the UEs have a Global Navigation Satellite System (GNSS) positioning capability and a TA pre-compensation capability. That is, the UE may obtain its own position information based on the GNSS capability, and calculate a latency corresponding to the service link according to its own position and a position of the serving satellite. In addition, for a transparently forwarding satellite architecture, if a ground base station does not perform TA compensation for the feeder link or only compensates part of the TA, the network device needs to broadcast a TA of the feeder link that is not compensated to the UE by means of the common TA. In this way, the UE may use a sum of the TA of the service link calculated by itself, the common TA broadcast by the network device, and a TA offset value broadcast by the network device as the first TA, and use the first TA for TA compensation so as to send msg1 or msgA.

In a non-GEO scenario, due to the high-speed motion of the satellite relative to the ground, the latency of the feeder link is constantly changing, which causes the network to frequently update the common TA. The update frequency requirement is likely to be higher than that of other SIs. How to broadcast the common TAs is a problem that needs to be solved.

In addition, in order to compensate a large Round-Trip Time (RTT) between the UE and the network in the NTN system, the RAN2 standardization discussion has agreed to introduce a time offset for some first timers related to the UE-gNB round-trip time, and the offset shall be equal to the RTT between the UE and the network in principle. In the non-GEO scenario, due to the high-speed operation of the satellite, the RTT between the UE and the network device also changes rapidly. The UE may obtain its own TA. If the network device does not perform the TA compensation (that is, the UL timing is aligned with the DL timing at the network side), the TA of the UE is equal to the RTT between the UE and the network device. Thus, the UE may set the offset values of these first timers to the TA value. However, if the network device has compensated part of the TA, the RTT between the UE and the network device shall be equal to the sum of the TA value maintained by the UE and the TA value compensated by the network. In order for the UE to learn the RTT, the network device needs to notify the UE by broadcasting of a second TA it has compensated. If the second TA compensated by the network is constantly changing, how to effectively broadcast the information is a problem to be solved.

Figure 6:
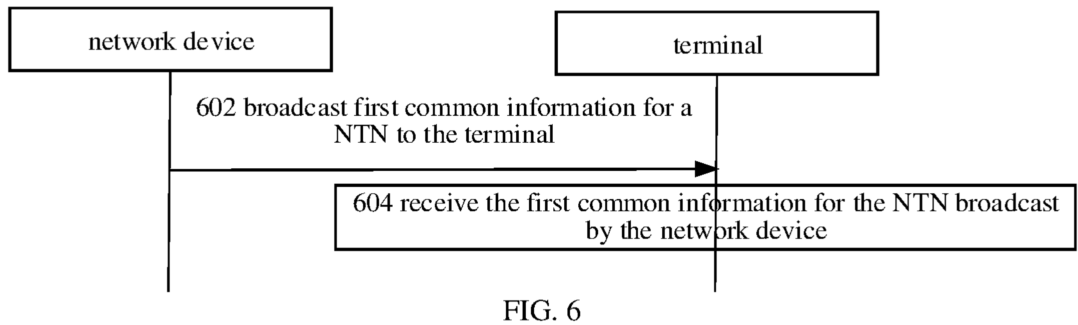
FIG. 6 is a flowchart of a method for broadcasting common information according to an exemplary embodiment of the present disclosure.

FIG. 6 shows a flowchart of a method for broadcasting common information according to an exemplary embodiment of the present disclosure. The embodiment is described by taking the method to be applied between a terminal and a network device as an example. The method includes steps 602 to 604.

In the step 602, the network device broadcasts first common information for a NTN to the terminal.

The first common information is a subset of all common information for the NTN. Exemplarily, the first common information is information related to TA, or information related to RTT.

The first common information for the NTN may also be considered as first common information for a NTN cell.

Exemplarily, the first common information for the NTN is carried in a System Information Block (SIB)n, where n is a positive integer. For example, a value range of n is 2 to 9, or the value range of n is greater than 9, which is not limited by the embodiment.

The first common information does not result in change of a system information update indication, and/or, the first common information does not result in change of valueTag in SIB1. Alternatively, update of the first common information does not result in change of the system information update indication, and/or update of the first common information does not result in change of the valueTag in SIB1.

The system information update indication is used for indicating whether there is an update of the SIB. When a value of the system information update indication changes, the terminal that requires SIB needs to receive the SIB again. Similarly, the valueTag in the SIB1 is also used for indicating whether there is an update of the SIB. When a value of valueTag in SIB1 changes, the terminal needs to receive the SIB corresponding to the valueTag again.

In an example, there is one valueTag in the SIB1, which corresponds to a plurality of SIBs. In another example, there are a plurality of valueTags in the SIB1, and each SIB corresponds to its own valueTag.

In an embodiment, no matter whether the first common information is updated or not, the change of the system information update indication and/or the change of the valueTag in the SIB1 will not be caused. Therefore, in a case where contents in the SIBn other than the first common information do not change, during any two different transmissions of the SIBn carrying the first common information, the value of the system information update indication remains unchanged and/or the value of the valueTag in the SIB1 remains unchanged.

Even if the first common information is updated, in the case where the contents in the SIBn other than the first common information do not change, during two transmissions of a SIBn carrying the pre-update first common information and a SIBn carrying the updated first common information, the value of the system information update indication remains unchanged and/or the value of the valueTag in the SIB1 remains unchanged.

In the step 604, the terminal receives the first common information for the NTN broadcast by the network device.

When the terminal needs to obtain the first common information, it receives the SIBn broadcast by the network device, and the SIBn carries the first common information for the NTN. The terminal reads and uses the first common information in SIBn.

To sum up, in the method provided by this embodiment, the first common information for the NTN is broadcast to the terminal by the network device, but the update of the first common information does not result in the change of the system information update indication, and/or does not result in the change of the valueTag in SIB1, so that the same or different first common information is broadcast multiple times in the same system information update period. Regardless of the magnitude of the system information update period, it is supported that the network device frequently updates the first common information for the terminal. That is, the network device can update the first common information in real time. The network device does not need to set the system information update period to be very small for the purpose of supporting the frequent update of the first common information.

In addition, since the update of the first common information does not result in the change of the system information update indication, for a terminal that does not need the first common information, it is not necessary for the terminal to read the system broadcast once every time the first common information is updated. This helps to avoid an invalid receiving process and reduce the power consumption of the terminal. The terminal can also obtain the real-time first common information according to its own needs, so as to ensure the timeliness in update of the first common information without affecting the update of other information, especially in a non-GEO scenario.

The above-mentioned first common information includes at least two cases.

In a first case, the first common information includes a common TA.

In a second case, the first common information includes a TA for assisting in determining a TA of a first timer.

The first timer includes one of the following:

a timer for a Random Access Response (RAR) window for the four-step random access;

a ra-ContentionResolutionTimer for the four-step random access;

a msgB-ResponseWindow timer for the two-step random access;

a sr-Prohibit Timer for sending a Scheduling Request (SR);

a Configured Grant (CG) timer, which is used to enable a CG transmission corresponding to an uplink Hybrid Automatic Repeat reQuest (HARQ) process of a HARQ retransmission;

a drx-HARQ-RTT-TimerDL corresponding to a downlink HARQ process of an enabled HARQ feedback; and a drx-HARQ-RTT-TimerUL corresponding to an uplink HARQ process of an enabled HARQ retransmission.

Figure 7:
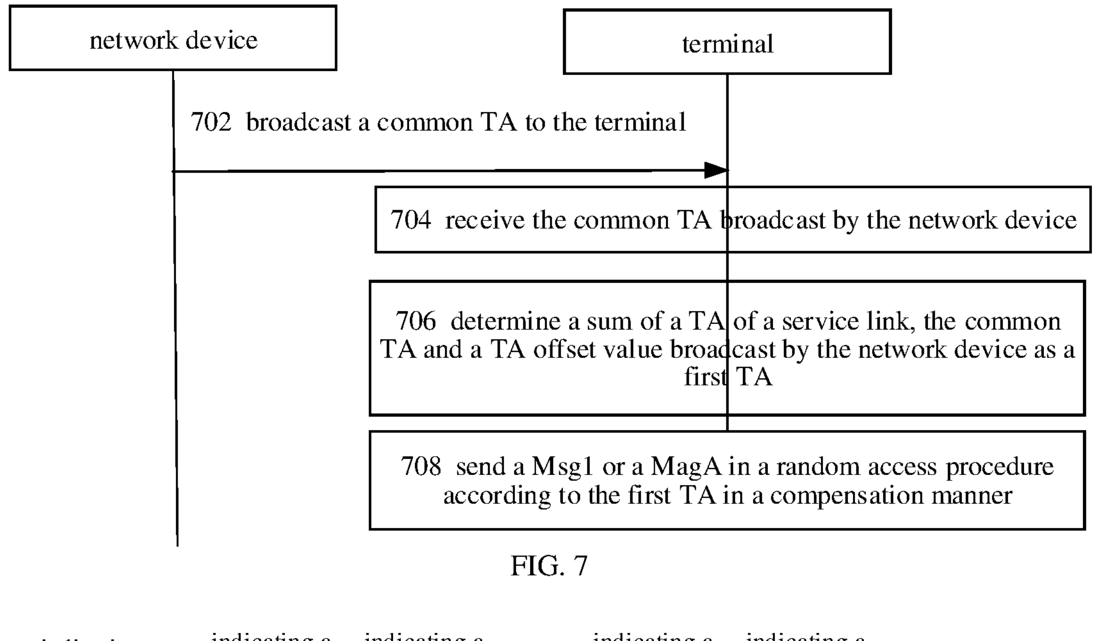
FIG. 7 is a flowchart of a method for broadcasting common information according to an exemplary embodiment of the present disclosure.

For the case where the first common information includes the common TA:

FIG. 7 shows a flowchart of a method for broadcasting common information according to an exemplary embodiment of the present disclosure. The embodiment is described by taking the method to be applied between a terminal and a network device as an example. The method includes steps 702 to 708.

In the step 702, the network device broadcasts the common TA to the terminal.

The network device broadcasts the SIBn to the terminal, and the SIBn carries the common TA.

The update of the common TA does not result in the change of the system information update indication, and/or the update of the common TA does not result in the change of the valueTag in the SIB1. In other words, the common TA does not result in the change of the system information update indication, and/or the common TA does not result in the change of the valueTag in the SIB1.

The common TA for the NTN is contained in the SIBn. Alternatively, the common TA of the NTN cell is contained in the SIBn. N is a positive integer. For example, n is 9.

The common TA is equal to: twice a total latency of a feeder link; or twice a partial latency of the feeder link; or twice a signal transmission latency from a satellite to a reference point.

In the step 704, the terminal receives the common TA broadcast by the network device.

The terminal receives the SIBn broadcast by the network device, and the SIBn carries the common TA.

When the terminal initiates the random access procedure, the UE reads the real-time common TA in the SIBn.

In the step 706, the terminal determines the sum of the TA of the service link, the common TA, and the TA offset value broadcast by the network device as the first TA, where the TA of the service link is calculated according to a terminal position and ephemeris information of the serving satellite.

The terminal calculates the TA of the service link based on the UE position and the ephemeris information of the serving satellite obtained based on the GNSS capability, and determines the sum of the TA of the service link, the common TA, and the TA offset value broadcast by the network device as the first TA.

The first TA is a TA value used for TA compensation at the terminal side.

In the step 708, the terminal sends Msg1 or MsgA in the random access procedure according to the first TA in a compensation manner.

When the random access procedure adopts the four-step random access procedure, after the TA compensation is performed by using the first TA, the Msg1 is sent. When the random access procedure adopts the two-step random access procedure, after the TA compensation is performed by using the first TA, the MsgA is sent.

Figure 8:
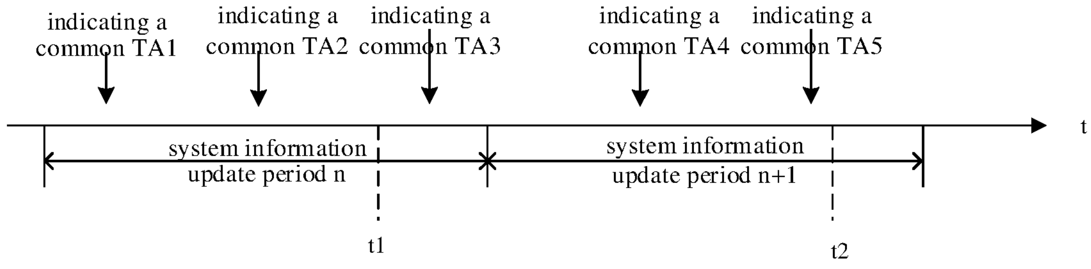
FIG. 8 is a time-frequency schematic diagram of a method for broadcasting common information according to an exemplary embodiment of the present disclosure.

With reference to the schematic diagram in FIG. 8, the base station indicates common TA1, common TA2, common TA3, common TA4, and common TA5 sequentially at different times. Since the update of the common TA does not result in the change of the system information update indication, the base station indicates three different common TAs in the system information update period n without considering the period length of the system information update period n. The base station indicates two different common TAs in the system information update period n+1 also without considering the period length of the system information update period n+1.

UE1 initiates the random access procedure at time t1, and reads SIBn to obtain and use the latest common TA2. UE2 initiates the random access procedure at time t2, and reads SIBn to obtain and use the latest common TA5.

To sum up, in the method provided by this embodiment, the common TA for the NTN is broadcast to the terminal by the network device, but the update of the common TA does not result in the change of the system information update indication, and/or does not result in the change of the valueTag in the SIB1, so that the same or different common TA is broadcast multiple times in the same system information update period. Regardless of the magnitude of the system information update period, it is supported that the network device frequently updating the common TA to the terminal. The network device does not need to set the system information update period to be very small in order to support the frequent update of the common TA.

In addition, since the update of the common TA does not result in the change of the system information update indication, for a terminal that does not need the common TA, it is not necessary for the terminal to read the system broadcast once every time the common TA is updated. This helps to avoid an invalid receiving process and reduce the power consumption of the terminal. The terminal can also obtain the real-time first common information according to its own needs, so as to ensure the timeliness in update of the first common information without affecting the update of other information, especially in the non-GEO scenario.

For the case where the first common information includes the TA for assisting in determining the offset value of the first timer.

Figure 9:
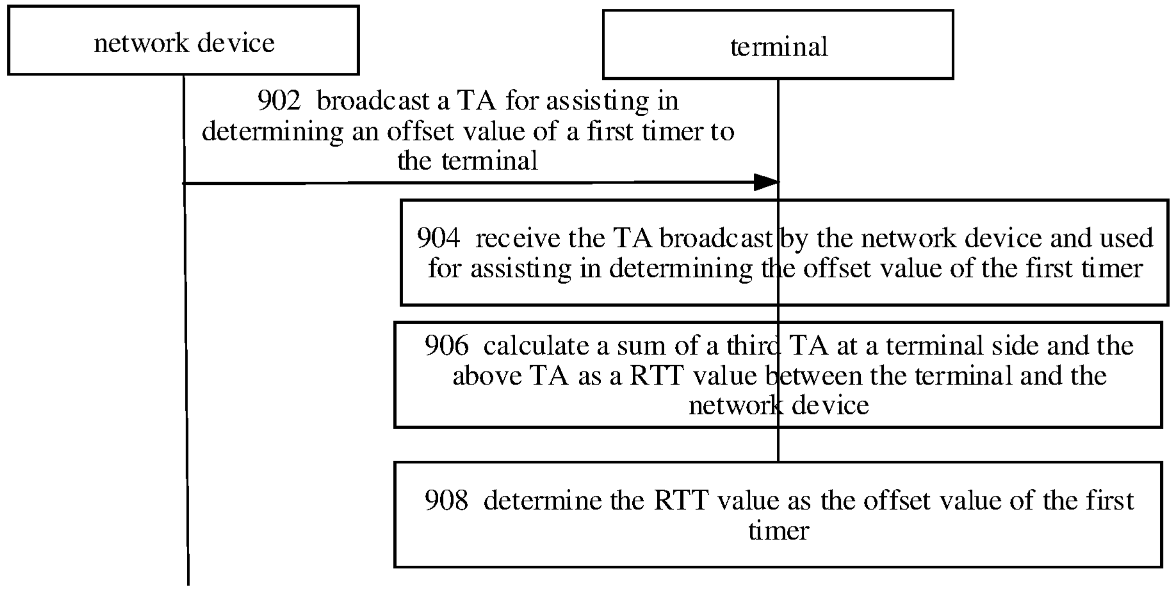
FIG. 9 is a flowchart of a method for broadcasting common information according to an exemplary embodiment of the present disclosure.

FIG. 9 shows a flowchart of a method for broadcasting common information according to an exemplary embodiment of the present disclosure. The embodiment is described by taking the method to be applied between a terminal and a network device as an example. The method includes steps 902 to 908.

In the step 902, the network device broadcasts the TA for assisting in determining the offset value of the first timer to the terminal.

The network device broadcasts the SIBn to the terminal, where the SIBn carries the TA for assisting in determining the offset value of the first timer.

Optionally, the TA for assisting in determining the offset value of the first timer is equal to a second TA at the network device side (referred to as the network side for short).

The update of the TA for assisting in determining the offset value of the first timer does not result in the change of the system information update indication, and/or, the update of the TA for assisting in determining the offset value of the first timer does not result in the change of the valueTag in the SIB1. In other words, the TA for assisting in determining the offset value of the first timer does not result in the change of the system information update indication, and/or does not result in the change of the valueTag in the SIB1.

It should be noted that the SIBn in the embodiment of FIG. 7 and the SIBn in the embodiment of FIG. 9 may be the same or different. For example, the SIBn in the embodiment of FIG. 7 is $SIBn_1$, and the SIBn in the embodiment of FIG. 9 is $SIBn_2$.

In the step 904, the terminal device receives the TA broadcast by the network device and used for assisting in determining the offset value of the first timer.

The terminal receives the SIBn broadcast by the network device, where the SIBn carries the TA for assisting in determining the offset value of the first timer.

Before the UE needs to start the first timer, the UE obtains the real-time TA for assisting in determining the offset value of the first timer by reading the SIBn.

In the step 906, the terminal calculates a sum of a third TA at the terminal side and the TA for assisting in determining the offset value of the first timer as a RTT value between the terminal and the network device.

The third TA at the terminal side is a TA maintained by the UE itself.

In the step 908, the terminal determines the RTT value as the offset value of the first timer.

Figure 10:
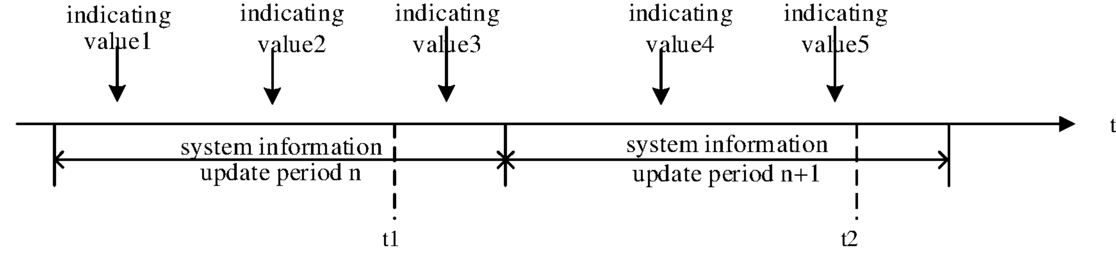
FIG. 10 is a time-frequency schematic diagram of a method for broadcasting common information according to an exemplary embodiment of the present disclosure.

With reference to the schematic diagram in FIG. 10, the base station sequentially indicates, at different times, value 1, value2, value3, value4, and value5 as the TA for assisting in determining the offset value of the first timer. Since the update of the value will not result in the change of the system information update indication, the base station indicates three different values in the system information update period n, without considering the period length of the system information update period n. The base station indicates two different values in the system information update period n+1 also without considering the period length of the system information update period n+1.

Before starting the first timer at time t1, UE1 reads SIBn to obtain and use value2. Before starting the first timer at time t2, UE2 reads SIBn to obtain and use value5.

To sum up, in the method provided by this embodiment, the TA for assisting in determining the offset value of the first timer is broadcast to the terminal by the network device, but the update of the TA for assisting in determining the offset value of the first timer does not result in the change of the system information update indication, and/or does not result in the change of the valueTag in the SIB1, so that the same or different TA for assisting in determining the offset value of the first timer is broadcast multiple times in the same system information update period. Regardless of the magnitude of the system information update period, it is supported that the network device frequently updates the TA for the terminal. The network device does not need to set the system information update period to be very small for the purpose of supporting the frequent update of the TA.

In addition, for a terminal that does not need the TA, it is not necessary for the terminal to read the system broadcast once every time the TA is updated. This helps to avoid an invalid receiving process and reduce the power consumption of the terminal. The terminal can also obtain the real-time first common information according to its own needs, so as to ensure the timeliness in update of the first common information without affecting the update of other information, especially in the non-GEO scenario.

Figure 11:
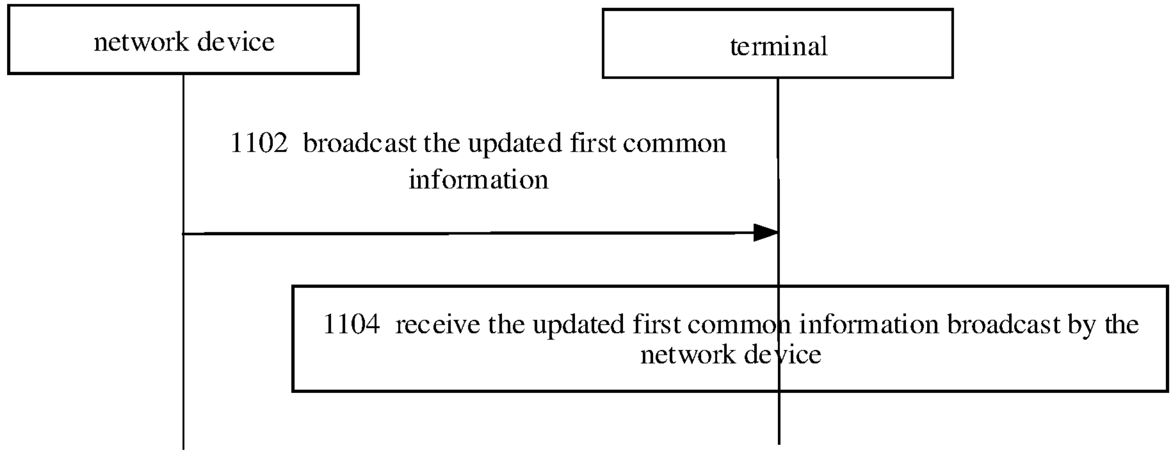
FIG. 11 is flowchart of a method for broadcasting common information according to an exemplary embodiment of the present disclosure.

FIG. 11 shows a flowchart of a method for broadcasting common information according to an exemplary embodiment of the present disclosure. The embodiment is described by taking the method to be applied between a terminal and a network device as an example. The method includes steps 1102 to 1104.

In the step 1102, the network device broadcasts the updated first common information.

The network device broadcasts the SIBn again in any transmission occasion of the SIBn after sending the pre-update first common information, where SIBn carries the updated first common information.

The updated first common information includes the updated common TA, or the TA for assisting in determining the offset value of the first timer.

The updated first common information does not result in the change of the system information update indication, and/or does not result in the change of the valueTag in the SIB1.

In the step 1104, the terminal receives the updated first common information broadcast by the network device.

In a case where the terminal needs to obtain the first common information, the terminal receives the SIBn broadcast again by the network device, where the SIBn carries the updated first common information.

To sum up, in the method provided by this embodiment, regardless of the magnitude of the system information update period, it is supported that the network device frequently updates the first common information for the terminal, and there is no need for considering to configure the system information update period to be a relatively small value, thereby reducing the occupation of the broadcast resource.

Figure 12:
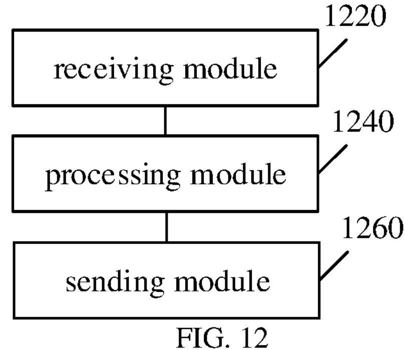
FIG. 12 is a block diagram showing an apparatus for broadcasting common information according to an exemplary embodiment of the present disclosure.

FIG. 12 shows a block diagram of an apparatus for broadcasting common information according to an exemplary embodiment of the present disclosure. The apparatus may be implemented as a terminal, or as a part of the terminal. The apparatus includes: a receiving module 1220, configured to receive first common information for a NTN broadcast by a network device.

The update of the first common information does not result in a change of a system information update indication, and/or the update of the first common information does not result in a change of valueTag in a SIB1.

In an optional implementation of this embodiment, the first common information for the NTN is carried in a SIBn, where n is a positive integer.

In an optional implementation of this embodiment, the receiving module 1220 is configured to receive the updated first common information broadcast by the network device.

In an optional implementation of this embodiment, the first common information is a common TA.

In an optional implementation of this embodiment, the common TA is equal to: twice a total latency of a feeder link; or, twice a partial latency of the feeder link; or, twice a signal transmission latency from a satellite to a reference point.

In an optional implementation of this embodiment, the apparatus includes a processing module 1240, configured to determine a sum of a TA of a service link, the common TA, and a TA offset value broadcast by the network device as a first TA, where the TA of the service link is calculated according to a terminal position and ephemeris information of a serving satellite.

The apparatus may further includes a sending module 1260, configured to send a Msg1 or a MsgA in a random access procedure according to the first TA in a compensation manner.

In an optional implementation of this embodiment, the common information is a TA for assisting in determining an offset value of a first timer.

In an optional implementation of this embodiment, the first timer includes one of the following:

- a timer for a random access response window for a four-step random access;
- a ra-ContentionResolutionTimer for the four-step random access;

a msgB-ResponseWindow timer for a two-step random access;

a sr-Prohibit Timer for sending a Scheduling Request (SR);

a Configured Grant (CG) timer, which is used to enable a CG transmission corresponding to an uplink Hybrid Automatic Repeat reQuest (HARQ) process of a HARQ retransmission;

a drx-HARQ-RTT-TimerDL corresponding to a downlink HARQ process of an enabled HARQ feedback; and a drx-HARQ-RTT-TimerUL corresponding to an uplink HARQ process of an enabled HARQ retransmission.

In an optional implementation of this embodiment, the TA for assisting in determining the offset value of the first timer is equal to a second TA at a network device side.

In an optional implementation of this embodiment, the processing module 1240 is configured to determine a RTT value between the terminal and the network device as the offset value of the first timer, where the RTT value is equal to a sum of a TA at a terminal side and the TA for assisting in determining the offset value of the first timer.

Figure 13:
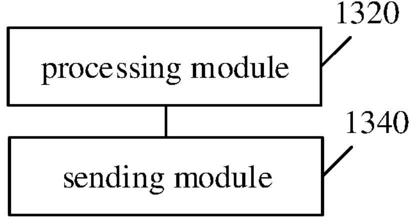
FIG. 13 is a block diagram showing an apparatus for broadcasting common information according to an exemplary embodiment of the present disclosure.

FIG. 13 shows a block diagram of an apparatus for broadcasting common information according to an exemplary embodiment of the present disclosure. The apparatus may be implemented as a network device, or as a part of the network device. The apparatus includes: a processing module 1320, configured to generate first common information for a NTN; and a sending module 1340, configured to broadcast the first common information for the NTN to a terminal.

The update of the first common information does not result in a change of a system information update indication, and/or the update of the first common information does not result in a change of a value tag (valueTag) in a SIB1.

In an optional implementation of this embodiment, the first common information for the NTN is carried in a SIBn, where n is a positive integer.

In an optional implementation of this embodiment, the sending module 1340 is configured to broadcast the updated first common information.

In an optional implementation of this embodiment, the first common information is information related to a TA.

In an optional implementation of this embodiment, the first common information is a common TA.

In an optional implementation of this embodiment, the common TA is equal to: twice a total latency of a feeder link; or, twice a partial latency of the feeder link; or, twice a signal transmission latency from a satellite to a reference point.

In an optional implementation of this embodiment, the first common information is a TA for assisting in determining an offset value of a first timer.

In an optional implementation of this embodiment, the first timer includes one of the following:

a timer for a random access response window for a four-step random access;

a ra-ContentionResolutionTimer for the four-step random access;

a msgB-ResponseWindow timer for a two-step random access;

a sr-Prohibit Timer for sending a Scheduling Request (SR);

a Configured Grant (CG) timer, which is used to enable a CG transmission corresponding to an uplink Hybrid Automatic Repeat reQuest (HARQ) process of a HARQ retransmission;

a drx-HARQ-RTT-TimerDL corresponding to a downlink HARQ process of an enabled HARQ feedback; and a drx-HARQ-RTT-TimerUL corresponding to an uplink HARQ process of an enabled HARQ retransmission.

In an optional implementation of this embodiment, the TA for assisting in determining the offset value of the first timer is equal to a second TA at a network device side.

The terminal mentioned in the foregoing embodiments may include various handheld devices with wireless communication functions, vehicle-mounted devices, wearable devices, computing devices, or other processing devices connected to wireless modems, as well as various forms of user equipment, Mobile Stations (MS), terminal devices, and so on. For convenience of description, the devices mentioned above are collectively referred to as the terminal.

The network device mentioned in the foregoing embodiments may be a base station, and the base station is a device deployed in an access network to provide the terminal with a wireless communication function. The base station may include various forms of macro base stations, micro base stations, relay stations, access points, and so on. In systems adopting different radio access technologies, names of devices with base station functions may be different. For example, in the LTE system, it is called eNodeB or eNB. In the NR system, it is called gNodeB or gNB. As the communications technologies evolve, the description of "base station" may change. For the convenience of embodiments of the present disclosure, the foregoing devices that provide wireless communication functions for terminals are collectively referred to as network devices.

Figure 14:
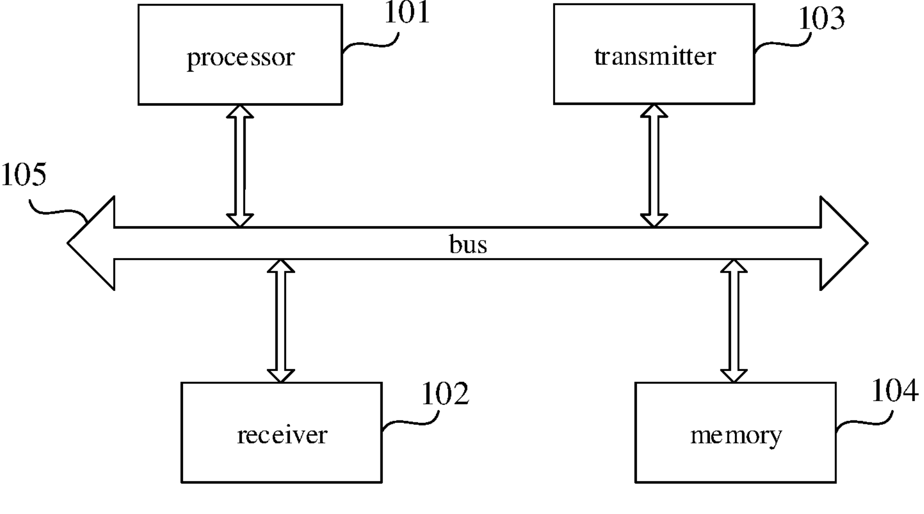
FIG. 14 is a block diagram showing a communication device according to an exemplary embodiment of the present disclosure.

FIG. 14 shows a schematic structural diagram of a communication device (a terminal or a network device) provided by an exemplary embodiment of the present disclosure. The communication device includes: a processor 101, a receiver 102, a transmitter 103, a memory 104, and a bus 105.

The processor 101 includes one or more processing cores. The processor 101 runs a software program and a module to execute various functional applications and perform information processing.

The receiver 102 and the transmitter 103 may be implemented as one communications component. The communications component may be a communications chip.

The memory 104 is connected to the processor 101 by using the bus 105.

The memory 104 may be configured to store at least one instruction. The processor 101 is configured to perform the at least one instruction, to implement various steps of the method for broadcasting common information mentioned in the foregoing method embodiments.

Operations performed by the sending module in FIG. 12 or FIG. 13 may be performed by the transmitter 103 in this embodiment. Operations performed by the receiving module in FIG. 12 or FIG. 13 may be performed by the receiver 104 in this embodiment. Operations performed in FIG. 12 or FIG. 13 other than the operations performed by the sending module and the receiving module may be performed by the processor 101 in this embodiment.

In addition, the memory 104 may be implemented by a volatile or non-volatile storage device of any type or a combination thereof. The volatile or non-volatile storage device includes but is not limited to: a magnetic disk or an optical disc, an Electrically-Erasable Programmable Read Only Memory (EEPROM), an Erasable Programmable Read Only Memory (EPROM), a Static Random Access Memory (SRAM), a Read-Only Memory (ROM), a magnetic memory, a flash memory, or a Programmable Read-Only Memory (PROM).

In an exemplary embodiment, there is further provided a computer-readable storage medium, and the computer-readable storage medium stores at least one instruction, at least one segment of program, a code set, or an instruction set. The at least one instruction, the at least one segment of program, the code set, or the instruction set are loaded and executed by the processor to implement the method for broadcasting common information provided by each of the above method embodiments and executed by the terminal or the network device.

In an exemplary embodiment, there is further provided a computer program product or a computer program, including computer instructions stored in a computer-readable storage medium and read by a processor of a communication device from the computer-readable storage medium. The processor is configured to perform the computer instructions to cause the communication device to perform the method for broadcasting common information as described in the above aspect.

A person of ordinary skills in the art can understand that all or part of the steps in the above embodiments may be implemented by hardware, or by a program to instruct relevant hardware to complete. The program may be stored in a computer-readable storage medium, and the above-mentioned storage medium may be a read-only memory, a magnetic disk, or an optical disk.

The foregoing descriptions are only preferred embodiments of the present application and are not intended to limit the present application. Any modification, equivalent replacement, improvement, and the like made within the spirit and principle of the present application shall be included in the protection scope of the present application.

What is claimed is:

1. A method for broadcasting common information, comprising:

receiving, by a terminal, first common information for a Non-Terrestrial Network (NTN) broadcast by a network device, wherein an update of the first common information does not result in a change of a system information update indication, and/or the update of the first common information does not result in a change of a value tag (valueTag) in a SIB1, wherein the first common information is a TA for assisting in determining an offset value of a first timer, and the first timer comprises a Configured Grant (CG) timer, used for enabling a CG transmission corresponding to an uplink Hybrid Automatic Repeat reQuest (HARQ) process of a HARQ retransmission.

2. The method according to claim 1, wherein the first common information is carried in a System Information Block (SIB)n, where n is a positive integer.

3. The method according to claim 1, wherein the method further comprises:

receiving, by the terminal, the updated first common information broadcast by the network device.

4. The method according to claim 1, wherein the method further comprises:

determining a sum of a TA for a service link, the common TA, and a TA offset value broadcast by the network device as a first TA, wherein the TA for the service link is calculated according to a terminal position and ephemeris information of a serving satellite; and sending a Msg1 or a MsgA in a random access procedure according to the first TA in a compensation manner.

5. The method according to claim 1, wherein the TA for assisting in determining the offset value of the first timer is equal to a second TA at a network device side.

6. The method according to claim 5, wherein the method further comprises:

determining a Round-Trip Time (RTT) value between the terminal and the network device as the offset value of the first timer, wherein the RTT value is equal to a sum of a third TA at a terminal side and the TA for assisting in determining the offset value of the first timer.

7. A terminal, comprising:

a processor;

a transceiver, connected to the processor; and a memory, configured to store executable instructions for the processor, wherein the processor is configured to load and execute the executable instructions to perform a method for broadcasting common information, comprising:

receiving first common information for a Non-Terrestrial Network (NTN) broadcast by a network device, wherein an update of the first common information does not result in a change of a system information update indication, and/or the update of the first common information does not result in a change of a value tag (valueTag) in a SIB1, wherein the first common information is a TA for assisting in determining an offset value of a first timer, and the first timer comprises a Configured Grant (CG) timer, used for enabling a CG transmission corresponding to an uplink Hybrid Automatic Repeat reQuest (HARQ) process of a HARQ retransmission.

8. The terminal according to claim 7, wherein the first common information is carried in a System Information Block (SIB)n, where n is a positive integer.

9. The terminal according to claim 7, wherein the method further comprises:

receiving the updated first common information broadcast by the network device.

10. A network device, comprising:

a processor;

a transceiver, connected to the processor; and a memory, configured to store executable instructions for the processor, wherein the processor is configured to load and execute the executable instructions to perform a method for broadcasting common information, comprising:

broadcasting first common information for a Non-Terrestrial Network (NTN) to a terminal, wherein an update of the first common information does not result in a change of a system information update indication, and/or the update of the first common information does not result in a change of a value tag (valueTag) in a SIB1, wherein the first common information is a TA for assisting in determining an offset value of a first timer, and the first timer comprises a Configured Grant (CG) timer, used for enabling a CG transmission corresponding to an uplink Hybrid Automatic Repeat reQuest (HARQ) process of a HARQ retransmission.

11. The network device according to claim 10, wherein the first common information is carried in a System Information Block (SIB)n, where n is a positive integer.

12. The network device according to claim 10, wherein the method further comprises:

broadcasting the updated first common information.

* * * * *